United States Patent [19]

Stone et al.

[11] Patent Number: 4,759,571
[45] Date of Patent: Jul. 26, 1988

[54] FLUID TRANSFER MODULE WITH MULTIPLE FLOW PATHS

[75] Inventors: Charles W. Stone, Bloomfield; Douglas B. Owen, Rochester, both of Mich.

[73] Assignee: D. W. Zimmerman Mfg., Inc., Madison Heights, Mich.

[21] Appl. No.: 925,624

[22] Filed: Oct. 31, 1986

[51] Int. Cl.[4] ............................................. F16L 15/00
[52] U.S. Cl. ........................................ 285/89; 285/39; 285/133.2; 285/330; 285/355; 417/394
[58] Field of Search ................ 285/133.1, 133.2, 89, 285/39, 330, 355; 417/394, 244

[56] References Cited

U.S. PATENT DOCUMENTS

| | | | |
|---|---|---|---|
| 1,696,844 | 12/1928 | Haynes et al. | 285/133.2 X |
| 1,981,863 | 11/1934 | Harris | 285/133.2 |
| 3,171,674 | 3/1965 | Bickel et al. | 285/133.2 X |
| 3,552,779 | 1/1971 | Henderson | 285/133.1 |
| 3,786,878 | 1/1974 | Chupman | 285/133.2 X |
| 4,360,320 | 11/1982 | Owen | 417/244 |
| 4,439,113 | 3/1984 | Owen | 417/394 |
| 4,468,175 | 8/1984 | Owen | 417/394 |

Primary Examiner—Dave W. Arola
Attorney, Agent, or Firm—Allen D. Gutchess, Jr.

[57] ABSTRACT

A fluid transfer module is provided with multiple flow paths for transferring multiple fluids. The module is particularly useful in downhole pumps for passing oil upwardly through a central passage and for passing gas up or down through concentric passages around the central passage. The module also can be used for water or fuel, particularly for downhole steam generation. The module includes an elongate housing or production tubing with an inner coupling having an attached, elongate inner tube which together form a central passage extending substantially the length of the housing. An outer coupling with an attached, elongate outer tube form an inner concentric passage with the inner coupling and tube and an outer concentric passage with the housing. The concentric flow paths are less restrictive to the flow of fluids therethrough. The new transfer module is easier to assemble, has a minimal number of joints, and the joints are designed such that fluid pressure does not tend to place axial force on the components tending to move them apart.

14 Claims, 3 Drawing Sheets

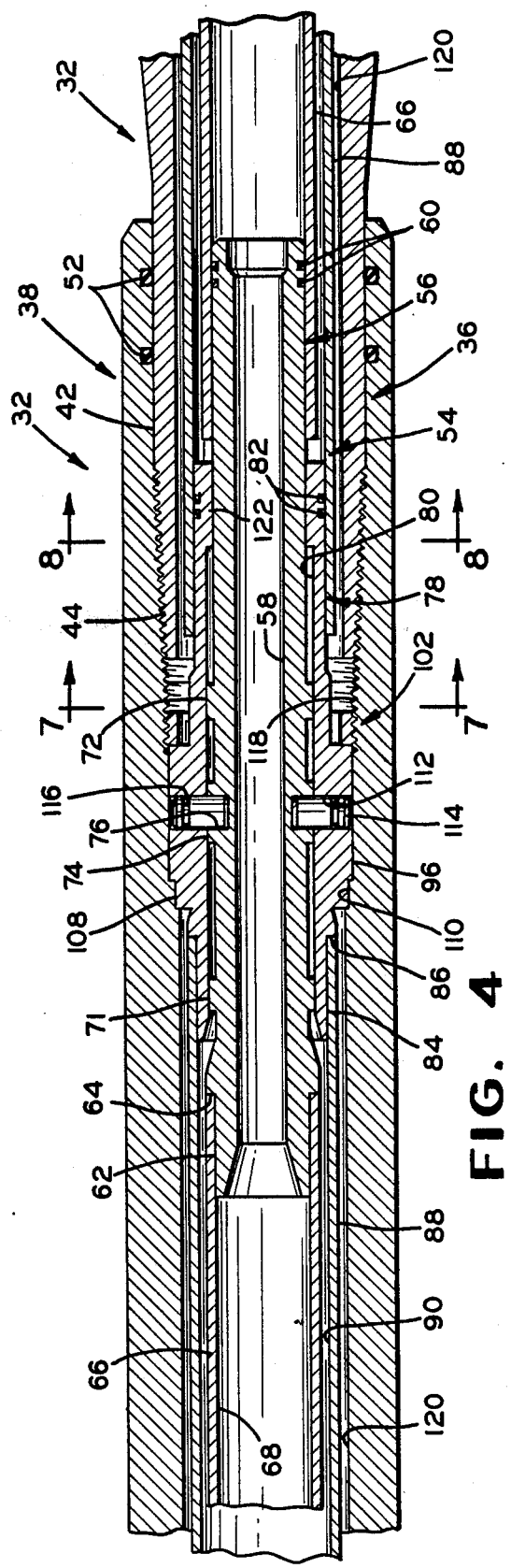
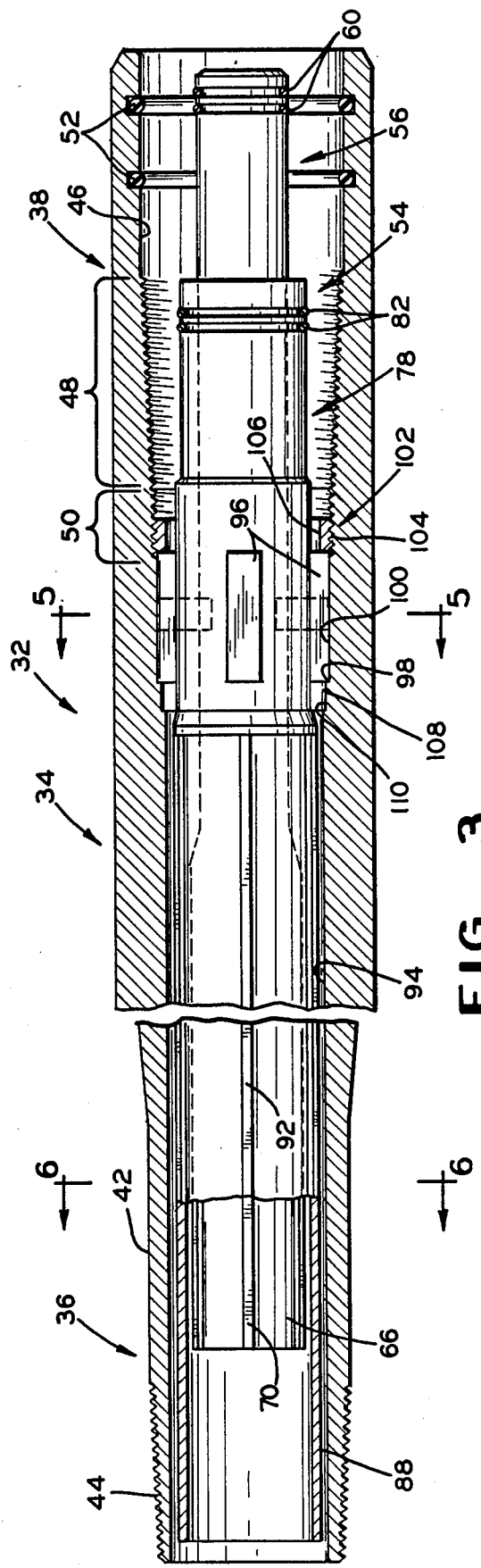

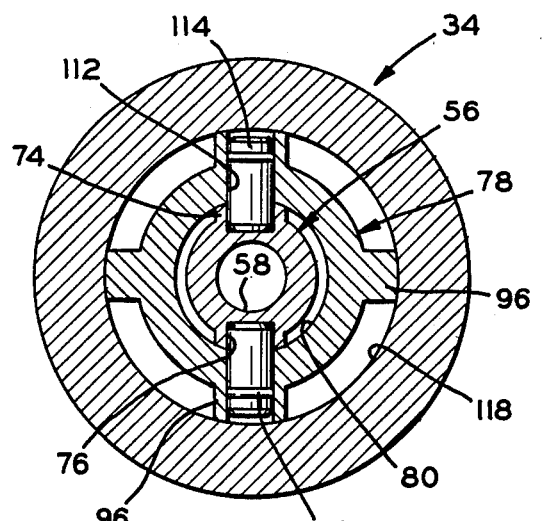
FIG. 5
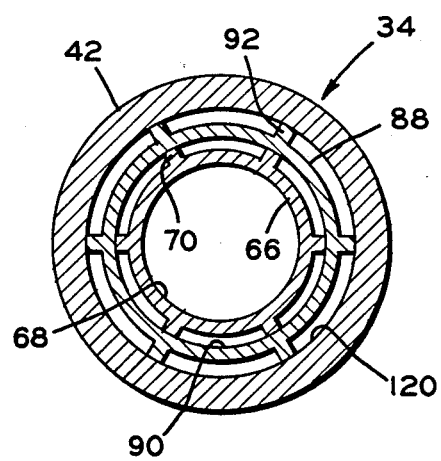
FIG. 6
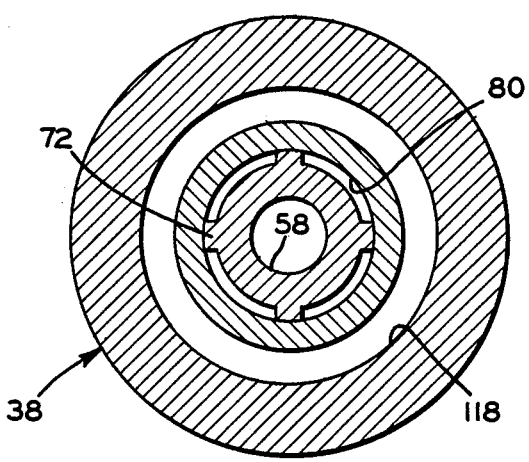
FIG. 7
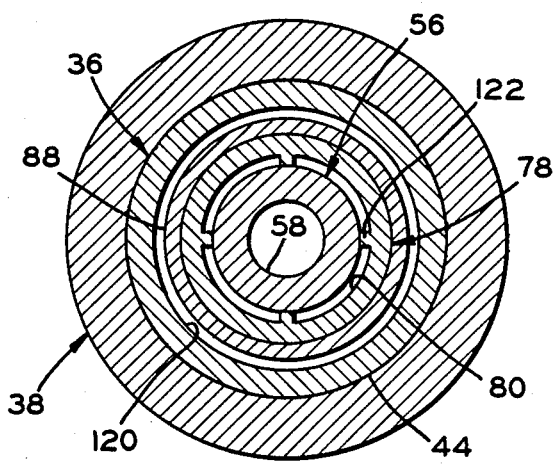
FIG. 8
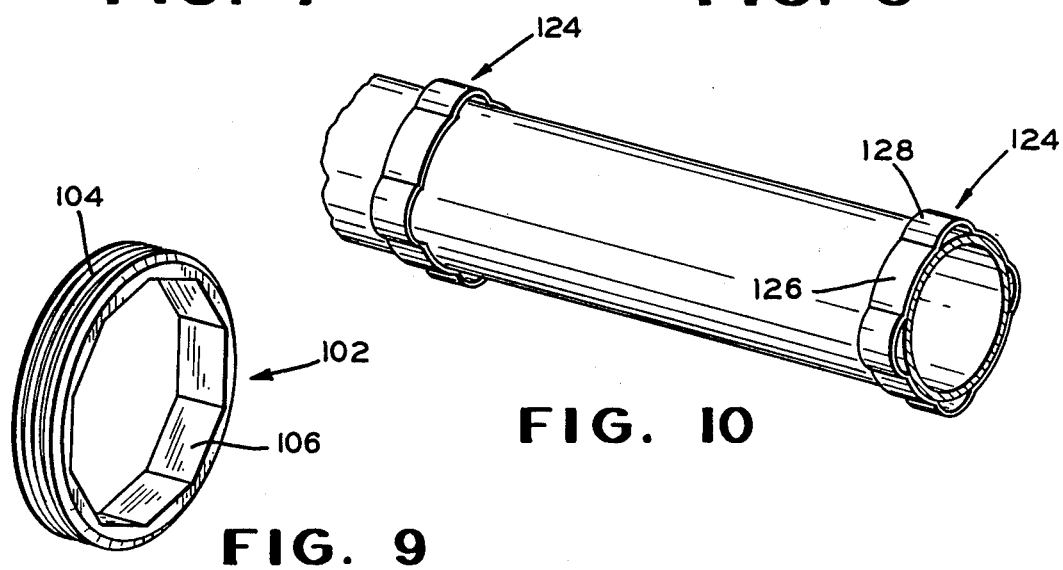
FIG. 9
FIG. 10

FLUID TRANSFER MODULE WITH MULTIPLE FLOW PATHS

This invention relates to fluid transfer modules providing multiple concentric flow paths for multiple fluids.

The transfer module in accordance with the invention constitutes an improvement over those disclosed in U.S. Pat. No. 4,360,320, issued Nov. 23, 1982; U.S. Pat. No. 4,439,113, issued Mar. 27, 1984; and U.S. Pat. No. 4,468,175, issued Aug. 28, 1984. The new module is particularly useful in downhole pumps for passing oil upwardly through a central passage and for passing gas up or down through concentric passages around the central passage.

The new transfer module includes an elongate housing or production tubing with male threads at a lower end and female threads at an upper end for connecting modules. The upper end of the housing has a core comprising an inner coupling with an elongate inner tube attached thereto forming a central fluid passage extending substantially through the housing. The core also includes an outer coupling with an elongate outer tube attached thereto and extending substantially the length of the housing. The outer coupling and outer tube form an inner concentric passage around the central passage with the inner coupling and inner elongate tube. The outer coupling and outer tube also form an outer concentric passage with the housing. The central passage can pass oil upwardly therethrough and the two concentric passages can pass gas up or down between modules thereabove and therebelow. The transfer module also can be used for supplying water or fuel downwardly, as for downhole steam generation.

The new module is easier to assemble with other modules. The concentric flow paths also are straighter and provide less restriction to the flow of fluids therethrough. The module has a minimal number of joints between components therein, resulting in lower assembly costs. The joints are also designed so that liquid pressure in one or more of the passages does not tend to place an axial force on the components which tend to move them apart, as has been true of modules heretofore known with side-by-side passages. This results in less maintenance requirements and greater reliability.

It is, therefore, a principal object of the invention to provide a fluid transfer module having multiple concentric flow paths for multiple fluids.

Another object of the invention is to provide a fluid transfer module with concentric flow paths which result in less restriction to the flow of fluids therethrough.

A further object of the invention is to provide a fluid transfer module which is more reliable and requires less maintenance.

Still another object of the invention is to provide a fluid transfer module which has fewer joints and is easier to assemble.

Many other objects and advantages of the invention will be apparent from the following detailed description of preferred embodiments thereof, reference being made to the accompanying drawings, in which:

FIG. 3 is an enlarged, fragmentary view in longitudinal cross section of a transfer module;

FIG. 4 is an enlarged view in longitudinal cross section of an end of one transfer module assembled with another end of another transfer module;

FIG. 5 is an enlarged view in transverse cross section taken along the line 5—5 of FIG. 3;

FIG. 6 is an enlarged view in transverse cross section taken along the line 6—6 of FIG. 3;

FIG. 7 is an enlarged view in transverse cross section taken along the line 7—7 of FIG. 4;

FIG. 8 is an enlarged view in transverse cross section taken along the line 8—8 of FIG. 4;

FIG. 9 is a view in perspective of a locking ring used in the transfer module; and FIG. 10 is a view in perspective of a modified component of the transfer module.

Figure 1:
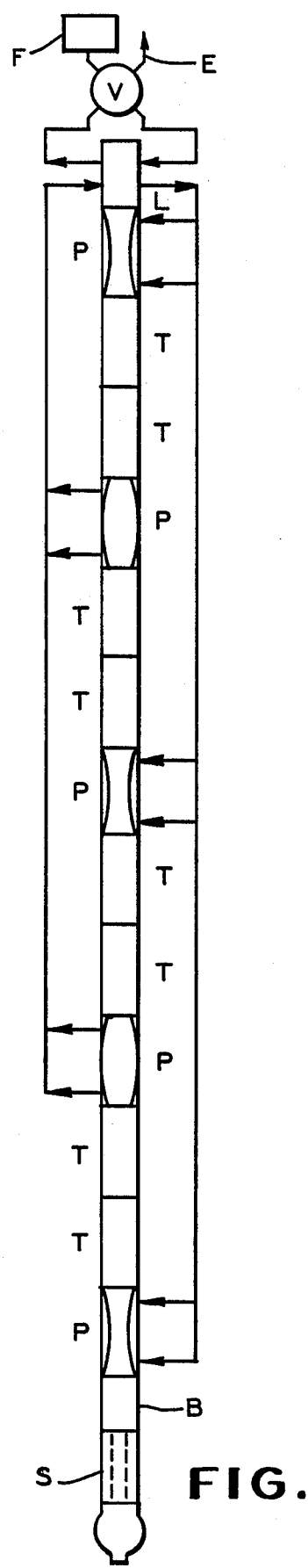
FIG. 1 is a diagrammatic view of a downhole pump, including a plurality of transfer modules in accordance with the invention.

An overall downhole pump with which the transfer module according to the invention can be used is shown in FIG. 1. Pump modules which pump oil or other liquid upwardly are designated "P" and transfer modules located between the pump modules are designated "T". Gas under pressure is supplied to the pump modules "P" from a source of fluid under pressure designated "F" above the surface of the ground, and an exhaust vent "E" is also located above the surface. The fluid and the exhaust vent are connected to internal lines through a valve "V" and a wellhead landing unit "L". When fluid under pressure is supplied to the pump modules, flexible tubular members or bladders, which are represented by curved lines in the pump modules, are compressed inwardly to force oil therein upwardly to the next transfer module "T". When the gas is exhausted from the pump modules "P", the bladders expand to receive oil from the next lower transfer module "T". The oil is supplied through a filter sleeve "S" and a bottomhole unit "B" at the bottom of the downhole pump.

The number of the transfer modules "T" employed can vary from one to about five. When one transfer module is used, the head against which the pump must pump is equal to the length of two pump modules plus the length of the transfer module. Although the higher head results in more pressure against which the pump must work, the use of fewer pump modules and more transfer modules is advantageous because the transfer modules do not employ the bladders, which add to the cost and increase maintenance. With the pump and transfer modules typically being thirty feet long, when two pump and four transfer modules are used, a head of one-hundred eighty feet results.

Figure 2:
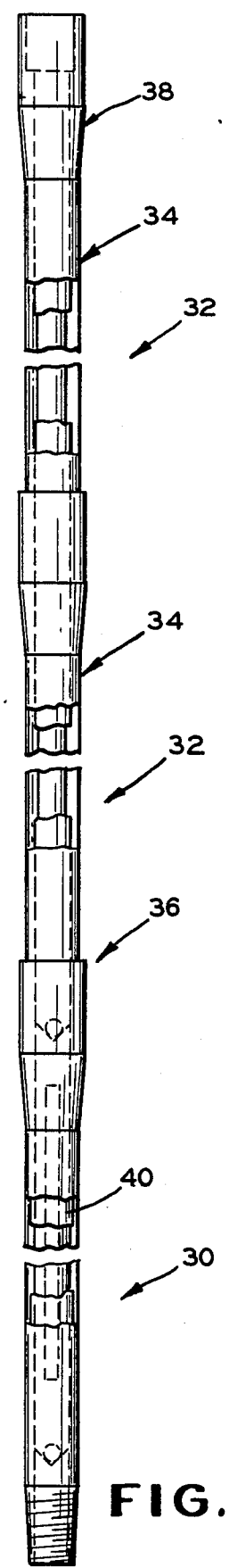
FIG. 2 is a schematic view, with parts broken away, of a pump module and transfer modules of FIG. 1.

Referring to FIG. 2, a pump module 30 and two transfer modules 32 are shown schematically in assembled relationship. The pump module can be the same as those shown in the aforesaid three patents, and preferably in U.S. Pat. No. 4,468,175, and will not be discussed in detail. The transfer module 32 has an elongate tubular housing or production tubing 34 with a lower coupling or connection 36 and an upper coupling or connection 38. The couplings are connected by tapered threads, to be discussed in more detail subsequently, and require no orientation when assembled. Each of the pump and transfer modules has means forming first and second fluid passage between the upper and lower ends and the pump module 30 also has a flexible member or bladder 40 of simple tubular shape around internal passages formed therein. A check valve is located at the lower end of the pump module 30 and a check valve is also located at or above the upper end of the module. The upper check valve can be located in a short tubing or housing similar to the housing 224 shown in FIG. 20 of the aforementioned U.S. Pat. No. 4,468,175. However, the upper check valve could also be located in the upper end of the pump module or in the lower end of the lowest transfer module.

Referring to the transfer module 32 of FIGS. 3 and 4, the lower coupling 36 of the elongate housing 34 has a straight cylindrical portion 42 below which extends a threaded projection 44 with tapered threads. The upper coupling 38 has a straight cylindrical recess 46 which receives the cylindrical portion 42 of the next module. A tapered threaded recess 48 of the coupling 38 receives the threaded projection 44 and a straight threaded recess 50 is located below the tapered threaded recess 48. Two sealing O-rings 52 in the cylindrical recess 46 receive the cylindrical portion 42 of the next coupling 36 in sealing relationship.

A coupling core 54 is located in the upper end of the elongate housing 34 and is supported thereby. The core 54 includes an inner coupling 56 of elongate, cylindrical configuration forming an inner central passage 58 which extends therethrough. The upper end of the coupling 56 is beveled and has two O-rings 60 for sealing purposes. A lower end of the coupling 56 has a cylindrical portion 62 and a shoulder 64 which receive an upper end of a first elongate tube 66. The tube 66 forms a central passage extension 68 of the central passage 58 with these passages extending from a location near the upper end of the transfer module 32 to a location just short of the lower coupling 36 of the module 32. The outer surface of the elongate tube 66 has means for maintaining concentricity in the form of elongate ribs 70 (see also FIG. 6), there being a plurality of the ribs uniformly-circumferentially-spaced around the tube. The coupling 56 also has four uniformly-circumferentially-spaced ribs 71 and four uniformly-circumferentially-spaced ribs 72 (see also FIG. 7) which are spaced longitudinally from the ribs 71. In between the ribs 71 and 72 are two diametrically-opposed thickened portions 74 on the coupling 56 having two diametrically-opposed recesses 76 therein which terminate short of the central passage 58 (see also FIG. 5).

An outer coupling 78 is located around the inner coupling 56 but is shorter, terminating short of both ends of the coupling 56. The outer coupling 78 has a central cylindrical core forming a first annular passage 80 with the outer surface of the inner coupling 56. The upper end of the outer coupling 78 is cylindrical with two sealing O-rings 82 on the outer surface. The lower end of the coupling 78 has a cylindrical extension 84 with an annular shoulder 86. These receive an upper end of a second elongate tube 88 which forms an extension 90 of the annular passage 80 with the outer tube 88 extending upwardly beyond the tube 66 and extending downwardly below the lower end of the tube 66. The lower end of the outer tube 88 is located near the lower end of the production tubing or housing 34. The outer tube 88 also has longitudinally extending ribs 92 which maintain concentricity with an inner cylindrical surface 94 of the elongate housing 34.

An intermediate portion of the outer coupling 78 has four circumferentially-spaced supporting ribs 96 (see also FIG. 5) therearound above the shoulder 86. The lower ends of these bear against an annular shoulder 98 formed on the inner surface of the housing 34 by a cylindrical bore 100. The upper end of the bore 100 terminates at the straight cylindrical threaded portion 50. A locking ring 102, as shown in FIG. 9, has outer threads 104 turned into the cylindrical threaded portion 50 to bear against upper ends of the supporting ribs 96 to hold the ribs and the outer coupling 78 securely in place. The ring 102 has a non-circular inner surface 106 by means of which the ring can be turned by a suitable annular tool. Two of the diametrically-opposite supporting ribs 96 have ears 108 extending downwardly therefrom which are received in notches 110 communicating with the cylindrical bore 100 of the housing 34. These prevent the outer coupling 78 from turning with respect to the housing 34. Two of the diametrically-opposite supporting ribs 96 also are wider and have transverse bores 112 extending therethrough and in alignment. These receive two supporting pins 114 which extend into the recesses 76 of the inner coupling 56 and have sealing O-rings 116 in the bores 112.

The outer coupling 78 and the outer, second tube 88 are supported only at the upper end of the elongate housing 34 through the supporting ribs 96 and the annular shoulder 98 of the housing with the locking ring 102 preventing upward movement of the outer coupling. The inner coupling 56 and the first elongate tube 66 are also supported only at the upper end of the housing 34 through the outer coupling 78 and the pins 114 which are received in the recesses 76. With this arrangement, the inner and outer tubes 66 and 88 can expand downwardly if they heat up during operation of the downhole pump.

A second, outer annular passage 118 is formed between the outer coupling 78 and the inner surfaces of the housing 34 with a second annular passage extension 120 formed between the outer surface of the second tube 88 and the inner cylindrical surface 94 of the housing 34.

Concentricity of the first annular passage 80 and the first annular passage extension 90 is maintained by the longitudinally spaced ribs 71 and 72 and the longitudinally-extending ribs 70 on the inner tube 66. For this purpose, the upper end of the coupling core 78 also has four uniformly-spaced, inwardly-extending ribs 122 (FIG. 8). Concentricity of the second annular passage 118 and the outer annular passage extension 120 is maintained through the supporting ribs 96 on the outer coupling 78 and the longitudinally-extending ribs 92 on the outer tube 88.

The transfer modules 32 are readily assembled with one another as shown in FIG. 4. When the threaded projection 44 of the upper module is received in the tapered threaded recess 48 of the lower module, the lower end of the first tube 66 is received over the upper end of the inner coupling 56 and the lower end of the second tube 88 is received over the upper end of the outer coupling 78 as the threaded projection 44 is turned into the recess 48. A fluid tight connection is aided by the O-rings 60 and 82 as the tubes turn on to the coupling ends. The O-rings 116 on the pins 114 also prevent possible leakage between the inner annular passage 80 and the outer annular passage 118. It may be noted that the lower ends of the inner and outer tubes 66 and 88 are directly connected to the inner and outer couplings 56 and 78 of another module without any additional coupling components at all being required at the lower ends of the tubes.

From the above, it will be seen that a minimum number of joints are required in the transfer module 32. Further, these joints are designed so that internal pressures in the passages do not tend to force the joints apart in a longitudinal direction, as has heretofore occurred. The passages 58, 80 and 118, along with the extensions 68, 90 and 120 also provide less resistance to flow than has heretofore been the result in some instances.

The first and second tubes 66 and 88 can be of fiberglass reinforced plastic material formed by a pultrusion process. However, the outer tube 88 in particular can be of metal, such as aluminum, when heat transfer is desirable between fluids in the concentric passage extensions 90 and 120.

When the tubes 66 and 88 are made by a pultrusion process, the longitudinally-extending ribs 70 and 92 thereon tend to significantly slow down the pultrusion rate. In such instances, in particular, spaced rings 124 of FIG. 10 can be employed in place of the ribs. The rings 124 include circumferentially extending portions 126 which can be bonded to the tube and bulbous portions 128 which extend outwardly and engage the inner surface of the tube 88 or the housing 32 to maintain the concentricity. The rings 124 need not be uniformly spaced longitudinally along the respective tube 66 or 88 but are particularly important near the lower ends to maintain concentricity there in order to facilitate the assembly of one of the transfer module 32 with another one or with a pump module therebelow.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. A fluid transfer module for transferring multiple fluids in generally vertical directions in a well between a fluid module therebelow and a fluid module thereabove, said fluid transfer module comprising an elongate housing, said housing having tapered male threads at its lower end and tapered female threads at an upper end portion, said housing having a straight female threaded portion below said tapered female threads, the upper end portion of said housing below said straight female threaded portion forming an upwardly-facing shoulder, an upper core in the upper end portion of said housing, said core comprising an inner coupling forming a central fluid passage, an outer coupling forming a first, inner annular fluid passage with said inner coupling and also forming a second, outer annular fluid passage with said elongate housing, said outer coupling having a downwardly-facing shoulder engaging said upwardly-facing shoulder of said elongate housing for supporting said outer coupling by said housing, said outer coupling also having an upwardly-facing shoulder extending upwardly to said straight female threaded portion of said outer housing, a threaded locking ring threadedly engaged in said straight female threaded portion of said elongate housing and engaging said upwardly-facing shoulder of said outer coupling to prevent movement of said outer coupling in an upward direction, said inner coupling having a recess at an intermediate portion thereof, said outer coupling having a transverse hole at an intermediate portion thereof aligned with said inner coupling recess, and a pin in said hole extending into said recess to support said inner coupling by said outer coupling, a first elongate tube attached to an end portion of said inner coupling and forming an extension of said central passage, a second elongate tube around at least a substantial portion of said first elongate tube, attached to an end portion of said outer coupling, and forming an extension of said first annular passage with said first elongate tube and an extension of said second annular passage with said elongate housing, and means at lower portions of said first and second elongate tubes for maintaining concentricity of lower portions of said first and second elongate tubes and the concentricity of lower portions of said second elongate tube and said elongate housing.

2. A fluid transfer module according to claim 1 characterized by said first and second elongate tubes terminating short of the lower end of said elongate housing.

3. A fluid transfer module according to claim 1 characterized by said elongate housing having a recess communicating with said upwardly-facing shoulder, and said downwardly-facing shoulder of said outer coupling having an ear extending into said recess to prevent rotational movement of said outer coupling.

4. A fluid transfer module according to claim 1 characterized by the upper end of said outer coupling terminating below the upper end of said inner coupling and an upper portion of said outer coupling having inwardly-extending means to maintain the concentricity of the upper end portion of said outer coupling relative to said inner coupling.

5. A fluid transfer module for transferring multiple fluids, said module comprising an elongate housing, an upper core in an upper end portion of said housing, said core comprising an inner coupling forming a central fluid passage, an outer coupling forming a first, inner annular fluid passage with said inner coupling, and also forming a second, outer annular fluid passage with said elongate housing, a first elongate tube attached to an end portion of said inner coupling and forming an extension of said central passage, a second elongate tube around at least a substantial portion of said first elongate tube, attached to an end portion of said outer coupling, and forming an extension of said first annular passage with said first elongate tube and an extension of said second annular passage with said elongate housing, said first and said second elongate tubes terminating in concentric lower end portions adapted to be received by end portions of inner and outer couplings of another module, the upper end portion of said housing having means forming an upwardly-facing shoulder, said outer coupling having means forming a downwardly-facing shoulder, said shoulders supporting said outer coupling and said second elongate tube, said downwardly-facing shoulder means on said outer coupling also forming an upwardly facing shoulder, said elongate housing having tapered female threads at its upper end and straight female threads below said tapered female threads, and a threaded locking ring threadedly received in said straight female threads and engaging said upwardly-facing shoulder of said downwardly-facing shoulder means to prevent upward movement of said outer coupling.

6. A fluid transfer module according to claim 5 characterized by means carried by at least one of said first and second elongate tubes at a lower end portion thereof for maintaining the concentricity of said first and second elongate tubes at the lower ends.

7. A fluid transfer module according to claim 6 characterized by means carried by said second elongate tube for maintaining the concentricity of the lower end portion of said second elongate tube relative to said elongate housing.

8. A fluid transfer module for transferring multiple fluids, said module comprising an elongate housing, an upper core in an upper end portion of said housing, said core comprising an inner coupling forming a central fluid passage, an outer coupling forming a first, inner annular fluid passage with said inner coupling, and also forming a second, outer annular fluid passage with said elongate housing, a first elongate tube attached to an end portion of said inner coupling and forming an extension of said central passage, a second elongate tube around at least a substantial portion of said first elongate tube, attached to an end portion of said outer coupling, and forming an extension of said first annular passage with said first elongate tube and an extension of said second annular passage with said elongate housing, said first and said second elongate tubes terminating in concentric lower end portions adapted to be received by end portions of inner and outer couplings of another module, the upper end portion of said housing having means forming an upwardly-facing shoulder, said outer coupling having means forming a downwardly-facing shoulder, said shoulders supporting said outer coupling and said second elongate tube, said elongate housing having recesses communicating with said upwardly-facing shoulder and said downwardly-facing shoulder means of said outer coupling having ears extending into said recesses to prevent rotational movement of said outer coupling.

9. A fluid transfer module for transferring multiple fluids, said module comprising an elongate housing, an upper core in an upper end portion of said housing, said core comprising an inner coupling forming a central fluid passage, an outer coupling forming a first, inner annular fluid passage with said inner coupling, and also forming a second, outer annular fluid passage with said elongate housing, a first elongate tube attached to an end portion of said inner coupling and forming an extension of said central passage, a second elongate tube around at least a substantial portion of said first elongate tube, attached to an end portion of said outer coupling, and forming an extension of said first annular passage with said first elongate tube and an extension of said second annular passage with said elongate housing, said first and said second elongate tubes terminating in concentric lower end portions adapted to be received by end portions of inner and outer couplings of another module, the upper end portion of said housing having means forming an upwardly-facing shoulder, said outer coupling having means forming a downwardly-facing shoulder, said shoulders supporting said outer coupling and said second elongate tube, said inner coupling having diametrically-opposed recesses, said outer coupling having transverse holes aligned with said inner coupling recesses, and pins in said holes and extending into said inner coupling recesses to support said inner coupling and said first elongate tube by said outer coupling.

10. A fluid transfer module for transferring multiple fluids between other modules connected to ends thereof, said transfer module comprising an elongate housing having a first end and a second end, a core in a first end portion of said housing, said core comprising an inner coupling forming a central fluid passage, an outer coupling forming a first, inner annular fluid passage with said inner coupling, said outer coupling also forming a second, outer annular fluid passage with said elongate housing, a first elongate tube attached to an end portion of said inner coupling and forming an extension of said central passage extending toward said second end of said elongate housing, a second elongate tube extending around said first elongate tube, attached to an end portion of said outer coupling, and forming an extension of said first annular passage with said first elongate tube and an extension of said second annular passage with said elongate housing, said first and said second elongate tubes terminating in concentric end portions near said second end of said elongate housing and being adapted to be received by end portions of inner and outer couplings of another module, said inner and outer couplings of said transfer module terminating near said first end of said elongate housing and adapted to receive first and second elongate tubes of still another module, the first end portion of said housing having means forming a first shoulder facing toward the first end of said housing, said outer coupling having means forming a first shoulder facing toward the second end of said housing, said shoulders preventing movement of said outer coupling and said second elongate tube toward the second end of said housing, said shoulder-forming means on said outer coupling also forming a second shoulder facing toward the first end of said housing, said housing having tapered female threads at its first end and straight female threads between said tapered threads and said second shoulder, and a threaded locking ring threadedly received in said straight female threads and engaging said second shoulder to prevent movement of said outer coupling toward the first end of said housing.

11. A fluid transfer module according to claim 10 characterized by means carried by at least one of said first and second elongate tubes at end portions near said second end of said elongate housing for maintaining the concentricity of said first and second elongate tubes at said end portions.

12. A fluid transfer module according to claim 11 characterized by means carried by said second elongate tube for maintaining the concentricity of the end portion of said second elongate tube near said second end of said elongate housing relative to said elongate housing.

13. A fluid transfer module for transferring multiple fluids between other modules connected to ends thereof, said transfer module comprising an elongate housing having a first end and a second end, a core in a first end portion of said housing, said core comprising an inner coupling forming a central fluid passage, an outer coupling forming a first, inner annular fluid passage with said inner coupling, said outer coupling also forming a second, outer annular fluid passage with said elongate housing, a first elongate tube attached to an end portion of said inner coupling and forming an extension of said central passage extending toward said second end of said elongate housing, a second elongate tube extending around said first elongate tube, attached to an end portion of said outer coupling, and forming an extension of said first annular passage with said first elongate tube and an extension of said second annular passage with said elongate housing, said first and said second elongate tubes terminating in concentric end portions near said second end of said elongate housing and being adapted to be received by end portions of inner and outer couplings of another module, said inner and outer couplings of said transfer module terminating near said first end of said elongate housing and adapted to receive first and second elongate tubes of still another module, the first end portion of said housing having means forming a first shoulder facing toward the first end of said housing, said outer coupling having means forming a first shoulder facing toward the second end of said housing, said shoulders preventing movement of said outer coupling and said second elongate tube toward the second end of said housing, said elongate housing having recesses communicating with said shoulder forming means of said housing, and said shoulder-forming means of said outer coupling having ears extending into said recesses to prevent rotational movement of said outer coupling.

14. A fluid transfer module for transferring multiple fluids between other modules connected to ends thereof, said transfer module comprising an elongate housing having a first end and a second end, a core in a first end portion of said housing, said core comprising an inner coupling forming a central fluid passage, an outer coupling forming a first, inner annular fluid passage with said inner coupling, said outer coupling also forming a second, outer annular fluid passage with said elongate housing, a first elongate tube attached to an end portion of said inner coupling and forming an extension of said central passage extending toward said second end of said elongate housing, a second elongate tube extending around said first elongate tube, attached to an end portion of said outer coupling, and forming an extension of said first annular passage with said first elongate tube and an extension of said second annular passage with said elongate housing, said first and said second elongate tubes terminating in concentric end portions near said second end of said elongate housing and being adapted to be received by end portions of inner and outer couplings of another module, said inner and outer couplings of said transfer module terminating near said first end of said elongate housing and adapted to receive first and second elongate tubes of still another module, the first end portion of said housing having means forming a first shoulder facing toward the first end of said housing, said outer coupling having means forming a first shoulder facing toward the second end of said housing, said shoulders preventing movement of said outer coupling and said second elongate tube toward the second end of said housing, said inner coupling having diametrically-opposed recesses, said outer coupling having transverse holes aligned with said inner coupling recesses, and pins in said holes extending into said inner coupling recesses to prevent movement of said inner coupling relative to said outer coupling.

* * * * *